US005573390A

United States Patent [19]

Takeuchi et al.

[11] Patent Number: 5,573,390

[45] Date of Patent: Nov. 12, 1996

[54] COATED SLIDING MATERIAL

[75] Inventors: Katsuhiro Takeuchi; Shogo Muramatsu, both of Aichi; Yoichiro Toyama, Kumamoto; Hirokazu Kondo, Aichi, all of Japan

[73] Assignees: Surtec Kariya Co., Ltd.; Taiho Kogyo Co., Ltd, both of Aichi, Japan

[21] Appl. No.: 338,507

[22] PCT Filed: Mar. 25, 1993

[86] PCT No.: PCT/JP93/00359

§ 371 Date: Jan. 27, 1995

§ 102(e) Date: Jan. 27, 1995

[51] Int. Cl.[6] ........................ F04C 18/344; F04C 18/356; B32B 15/04; B32B 15/20

[52] U.S. Cl. .......................... 418/178; 418/179; 428/650; 428/652; 428/680

[58] Field of Search .................................... 418/178, 179; 428/650, 652, 680

[56] References Cited

U.S. PATENT DOCUMENTS 5,269,838 12/1993 Inoue et al. ............................ 427/438

FOREIGN PATENT DOCUMENTS

| | | | |
|---|---|---|---|
| 55-49939 | 12/1980 | Japan . | |
| 59-149326 | 8/1984 | Japan . | |
| 60-15706 | 1/1985 | Japan . | |
| 60-19901 | 2/1985 | Japan | 418/178 |
| 63-100284 | 5/1988 | Japan | 418/178 |
| 63-259082 | 10/1988 | Japan . | |
| 63-255377 | 10/1988 | Japan . | |
| 64-32087 | 2/1989 | Japan . | |
| 4-73427 | 3/1992 | Japan . | |
| 4159484 | 6/1992 | Japan | 418/178 |

*Primary Examiner*—John J. Vrablik
*Attorney, Agent, or Firm*—Armstrong, Westerman, Hattori, McLeland & Naughton

[57] ABSTRACT

In order to prevent the cracking of a coating of sliding material, in which an electroless Ni-B plating coating layer is formed on the surface of aluminum alloy, an electroless Ni-P plating coating layer is provided on the aluminum alloy.

10 Claims, 1 Drawing Sheet

COATED SLIDING MATERIAL

TECHNICAL FIELD

The present invention relates to sliding material. More particularly, the present invention relates to sliding material used for the substrate of such sliding members as the vane, scroll, piston and the like of a cooler-compressor, said substrate consisting of aluminum-alloy being subjected to surface treatment.

PRIOR ART

It is known that the aluminum-alloy is used for the above described sliding material to reduce weight, and, further, surface treatment is carried out for enhancing its sliding properties.

As a prior art of surface treatment for enhancing the seizure-resistance of a scroll made of aluminum-alloy, Japanese Unexamined Patent Publication No. Sho 62-199,982 refers to electroless Ni plating, ceramic dispersion-plating, ceramic flame-plating and the like, as prior art. Allegedly, the electroless Ni-B plating is superior to these prior arts because of good wear-resistance and distribution of coating thickness.

Japanese Unexamined Patent Publication No. Sho 58-193,355, which belongs to a prior art of the surface treatment, is related to the plating method in which the electroless Ni-P plating is applied on the surface of a work piece made of steel and, subsequently, electroless composite plating is carried out with co-deposition of ultra-hard fine particles. It teaches that flash plating by the electroless Ni-P plating acts as a precursor of the composite plating and improves the throwing power of the plating.

In addition, Japanese Examined Patent Publication No. Hei 2-50,993 is related to the improvement of corrosion-resistance of coating, in which an Ni-W-P plating layer is formed on an Ni-P plating layer. Allegedly, no drawbacks of each of these plating layers appear, but, the coating provided exhibits improved corrosion-resistance, hardness, wear-resistance, and resistance to embrittlement, when these layers are used in a combination.

Since the hardness of Ni-B plating is in the range of Hv=700~900, while the hardness of aluminum alloy is in the range of Hv=100~140, the difference in hardness between the plating coating and the aluminum-alloy, which is a substrate, is very great. In addition, since the internal tensional stress acts on the Ni-B plating coating, peeling is likely to occur. Because of this property of the Ni-B plating coating, when the Ni-B plating coating is directly applied on the surface of aluminum alloy, and is exposed to the reciprocating load or impact force from the opposite material, chipping or peeling is likely to occur. This exerts a detrimental influence upon the sliding properties of Ni-B plating. Thin Zn plating is also carried out as a pre-treatment prior to the application of Ni-B plating. However in this case also, the problems as described above occur.

When Ni-B plating is applied on the surface of aluminum-alloy directly or with an intermediary of the Zn intermediate plating layer, Al or Zn dissolves from the work piece into the Ni-B plating liquid and is then incorporated into the Ni-B plating coating. Al and Zn exert a detrimental influence in the form of impurities and result in decomposition of the plating liquid and hence impairment of productivity.

DISCLOSURE OF INVENTION

It is, therefore, an object of the present invention to discourage chipping and peeling of the electroless Ni-B plating coating formed on the surface of aluminum-alloy, and to provide a sliding material whose electroless plating liquid is not detrimentally influenced by the dissolution of components of the mother material.

The sliding material according to the present invention is characterized by the provision of an electroless Ni-B plating coating formed of the surface of aluminum alloy via the intermediary of an electroless Ni-P plating coating.

The Ni-P plating is known itself and is used as the underlying plating layer in the above referred Japanese Unexamined Patent Publication No. sho 58-193,355 and Japanese Examined Patent Publication No. Hei 2-50,933. The present invention is different from the these prior arts in the point that the Ni-P plating is used as an underlying plating for the purpose of preventing chipping, peeling and the like of the electroless Ni-B plating coating.

DETAILED DESCRIPTION OF THE INVENTION

Figure 1:
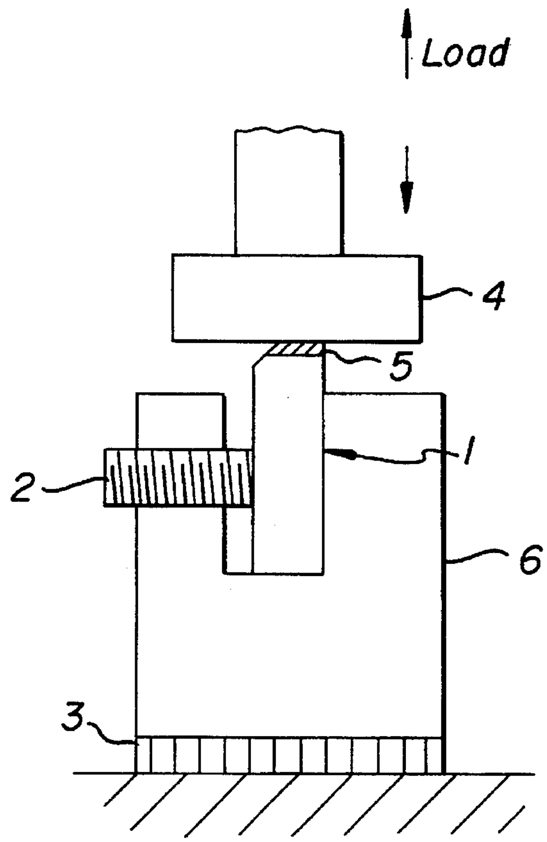
FIG. 1 is a drawing showing the testing apparatus of fatigue resistance.
Figure 2:
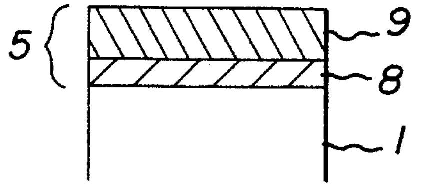
FIG. 2 is a drawing showing a coated sliding material of the present invention.
Figure 3:
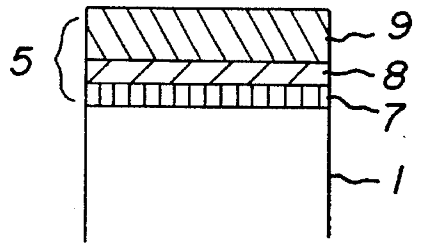
FIG. 3 is a drawing showing a coated sliding material of the present invention.

The electroless Ni-P plating is formed by a method known under the common name of "Kanigen plating" or the like. The electroless Ni-P plating liquid sold by Japan Kanigen Co., Ltd., and Uemura Industries Co., Ltd., can be used. Heat treatment may be carried out at 200°~300° C. after carrying out the electroless Ni-P plating. Thickness of the plating coating is preferably from 0.5 to 50 μm, more preferably from 1 to 20 μm The electroless Ni-B plating coating is formed by a known method using electroless plating liquid which contains nickel sulfate, amine borane and the like. The electroless Ni-B plating liquid sold by Dipsole Co., Ltd., Uemura Industries Co., Ltd., and Okuno Pharmaceutical Co., Ltd., can be used. Thickness of the electroless Ni-B plating coating is preferably from 5 to 50 μm, more preferably from 10 to 30 μm.

The substrate, on which these plating coatings are formed, is aluminum or its alloy. For example, a high-Si Al alloy can be used as the aluminum alloy. The surface of such aluminum alloy is polished to adjust the roughness. Subsequently, a pre-treatment, such as Zn displacement plating 7, may be applied, to the aluminum alloy, followed by application of Ni-P plating 8 and the electroless Ni-B plating 9.

The underlying, electroless Ni-P plating coating can prevent the electroless Ni-B plating coating from peeling and chipping, presumably for the following reasons. The electroless Ni-P plating has a hardness of Hv 400~500 and amorphous structure. The electroless Ni-P plating coating is therefore softer than and of a structure different from the micro-crystalline Ni-B coating having a hardness of Hv 700~900. In addition, the Ni-P plating has excellent throwing power. Furthermore, the hardness distribution profile of the coating with an intermediary Ni-P layer is gentle as compared with the Ni-B layer directly applied on the substrate. Due to these properties, the electroless Ni-P coating enhances the adherence of the electroless Ni-B plating coating and acts as a buffer layer when impact is imparted.

In addition, since the growth speed of the electroless Ni-P plating is fast as compared with that of the electroless Ni-B coating, it is possible to prevent the dissolution of Zn, Al and the like from the substrate or intermediate layer.

Since the electroless Ni-P plating coating has the properties as described above, it mitigates the load concentration in the electroless Ni-B plating coating and enhances its fatigue resistance. Therefore, fatigue peeling does not occur, allowing the sliding member according to the present invention to be used stably over a long period. The electroless Ni-P plating coating is a barrier metal which prevents the Al dissolution from the aluminum substrate, or the Zn dissolution from the Zn plating coating. By this, the productivity is enhanced and the treatment properties are stabilized.

In addition, the heat treatment carried out after the electroless Ni-P plating or electroless Ni-B plating renders the Ni-P plating structure micro-crystalline and hence increases its hardness to approximately Hv 700 or more. The heat treatment also enhances the adherence of Ni-P plating to both the substrate and Ni-B plating coating.

The present invention is hereinafter described further in detail by way of an example.

BEST MODE FOR CARRYING OUT THE INVENTION

An aluminum-alloy rolled sheet (JIS, ADC12) was subjected to degreasing, etching and Zn displacement plating (Zn displacement liquid produced by Okuno Pharmaceutical Co., Ltd.). The following plating treatment was then carried out.

(1) Electroless Ni-B plating (comparative example)

Electroless Ni-B plating liquid (product of Okuno Pharmaceutical Co., Ltd.) was used to form a 20 μm thick plating coating (hardness Hv 700~900).

(2) Electroless Ni-B plating after electroless Ni-P plating (inventive example)

Electroless Ni-P plating liquid (product of Okuno Pharmaceutical Co., Ltd.) was used to form a 2 μm thick plating coating, and, subsequently, the electroless Ni-B plating coating according to (1) was formed.

(a) Generation of peeling

Each ten coatings for the above coatings (1) and (2) were subjected to the peeling-property test by the following method. An indenter of a Rockwell C harness-tester (radius of curvature of the diamond front tip is 0.2 mm, and the angle of diamond front tip is 120°) was pressed against the surface of the plating coating and was moved on the plating surface in a horizontal direction, while the pressing load in the vertical direction was increased at a rate of 30 kgf/min up to 12 kgf. The moving speed of the indenter was: $F_y$ (the speed in horizontal direction to the surface of the plating coating) =10 mm/min, and, $F_z$ (the vertical and downward speed to the surface of plating coating) =15 mm/min. As a result of these tests, the following properties were observed.

Presence or absence of peeling was investigated when the load to reached the maximum. Peeling did not occur for all the coatings of the example (2), while all the coatings of the comparative example (1) peeled.

(b) Adherence strength of the coating

Load in a horizontal direction, at which the peeling generated, was measured to evaluate the adherence.

Inventive Example: 12 kgf or more for all ten coatings
Comparative Example: 6 kgf for all ten coatings

(c) Fatigue resistance

Coating was formed on a vane of a rotary compressor by the methods (1) and (2). For the so prepared samples, the fatigue resistance was measured by the apparatus shown in FIG. 1. In the drawing, 1 is a vane, 2 is a fixing bolt, 3 is a rubber vibration-insulator, 4 is quenched steel which is the opposing material, 5 is the coating layers. The test was carried out under the following condition.

Load: minimum zero—maximum 2000 kgf (refer arrow)
Frequency: Hz
Number of times repeated: $5\times10^4$, $10\times10^4$, $20\times10^4$ times
Test results are shown in Table 1.

TABLE 1

| | Repeating Number of times repeated | | |
|---|---|---|---|
| | $5 \times 10^4$ | $10 \times 10^4$ | $20 \times 10^4$ |
| Comparative Example | Test N=1 No peeling | Test N=3. Peeling | Test N=1 Peeling |
| Inventive Example | Test N=1 No peeling | Test N=3 No peeling | Test N=1 No peeling |

As is understood from the above example, the inventive electroless plating coating does not peel, as opposed to the electroless Ni-B coating alone. The inventive electroless plating coating has improved adherence and fatigue-resistance.

INDUSTRIAL APPLICABILITY

The sliding material provided by the present invention does not peel during sliding against the opposite material, and, therefore, exhibits stably excellent wear-resistance of the electroless Ni-B plating.

We claim:

1. A vane of a compressor, comprising a coated sliding material wherein said coated sliding material comprises: an aluminum alloy, an electroless Ni-P plating coating having a thickness from 0.5 to 50 μm provided on the surface thereof and an electroless Ni-B plating coating provided on the Ni-P plating coating.

2. The vane of a compressor of claim 1, wherein said electroless Ni-B plating coating has a thickness of 5 to 50 μm.

3. The vane of a compressor of claim 2, wherein said electroless Ni-P plating coating has a thickness of 1 to 20 μm.

4. The vane of a compressor of claim 3, wherein said electroless Ni-P plating coating is approximately one tenth the thickness of said electroless Ni-B plating coating.

5. The vane of a compressor of any one of claims 1–4, wherein said electroless Ni-P plating coating has a hardness of more than 700 Hv.

6. A vane of a compressor,comprising an aluminum alloy a Zn displacement plating applied on the aluminum alloy surface, an electroless Ni-P plating coating having a thickness of 0.5 to 50 μm provided on the surface of the Zn displacement coating and an electroless Ni-B plating coating provided on the surface of said electroless Ni-P coating.

7. The vane of a compressor of claim 6, wherein said electroless Ni-B plating coating has a thickness of 5 to 50 μm.

8. The vane of a compressor of claim 7, wherein said electroless Ni-P plating coating has a thickness of 1 to 20 μm.

9. The vane of a compressor of claim 8, wherein said electroless Ni-P plating coating is approximately one tenth the thickness of said electroless Ni-B plating coating.

10. The vane of a compressor of any one of claims 6–9, wherein said electroless Ni-P plating coating has a hardness of more than 700 Hv.

* * * * *